Dec. 23, 1947. G. W. SMITH 2,433,167
MIXING THE EFFLUENT OF A POTASSIUM BASE EXCHANGER
WITH WATER FOR USE IN A BOILER
Filed June 21, 1943
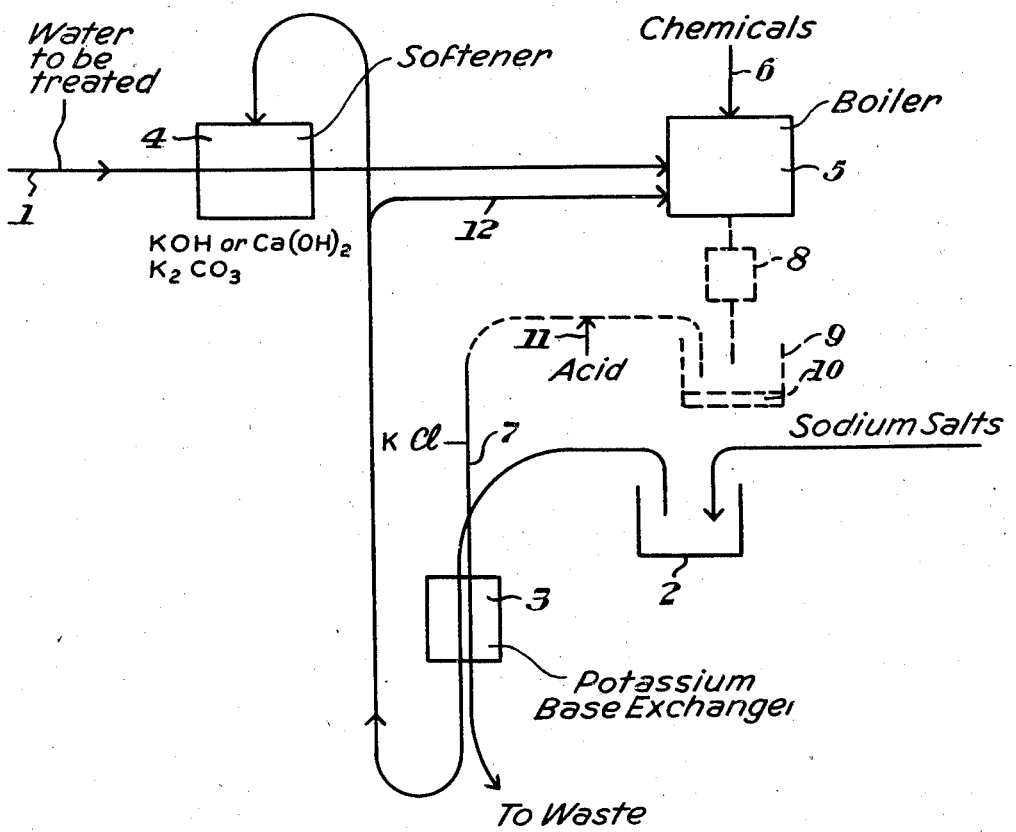
INVENTOR
George W. Smith
by
Stebbins and Blenko.
His Attys.

Patented Dec. 23, 1947

2,433,167

UNITED STATES PATENT OFFICE 2,433,167

MIXING THE EFFLUENT OF A POTASSIUM BASE EXCHANGER WITH WATER FOR USE IN BOILERS

George W. Smith, Pittsburgh, Pa., assignor to Hall Laboratories, Inc., Pittsburgh, Pa., a corporation of Pennsylvania Application June 21, 1943, Serial No. 491,625

7 Claims. (Cl. 210—24)

This invention relates to treatment of water for use in steam boilers. It relates more particularly to the manufacture of potassium salts from the relatively cheap corresponding sodium, alkaline-earth, or magnesium salts by a base-exchange method, and the utilization of the potassium salts so produced in the treatment of water for boiler feed.

The use of potassium salts in a system for treating water for use in a boiler has been found desirable for preventing the formation of siliceous deposits in the boiler and in turbines employing steam produced by the boiler. The present invention provides a process whereby the benefits of employing potassium salts having anions useful in the treatment of water for steam boilers is obtained, and yet the cost of producing these salts is relatively low. In my process I take a relatively inexpensive salt such, for example, as a sodium phosphate, sodium carbonate, sodium bicarbonate, sodium sulphite, sodium sulphate, sodium nitrate, or sodium silicate, all of which contain anions useful in the treatment of water for steam boilers, and I convert these salts into the corresponding potassium salts which likewise will contain anions useful in the treatment of water for use in a boiler. In carrying out the conversion of the sodium salts to potassium salts I use a base exchanger which is regenerated with a low-cost potassium salt such, for example, as potassium chloride. Thus relatively high-cost potassium salts having anions useful in the treatment of water for steam boilers are produced from relatively inexpensive sodium salts and potassium salts. The solution of the potassium salt so formed is then used for treating water for steam boilers without the expense of intermediate separation and recovery in solid form.

The accompanying drawing illustrates in a diagrammatic manner the way in which the process may be carried out.

Referring now more particularly to the drawing, a relatively cheap sodium salt, for example sodium carbonate, is dissolved in water to form a solution having a concentration of at least 0.5% by weight. The concentration of the salt in the solution may vary over fairly wide ranges, but for economical operation of the process it should not be less than about 0.1% nor greater than about 10%. The sodium carbonate solution from the container 2 is passed through a potassium base exchanger 3 whereby the sodium carbonate is converted into potassium carbonate. Both the cation K+ and the anion $CO_3^-$ of the potassium carbonate serve useful purposes in the treatment of water for use in the boiler. As mentioned previously, the use of the potassium ion inhibits the formation of siliceous deposits in the boiler or turbine, whereas the carbonate ion is useful in precipitating calcium carbonate in an external softener.

The potassium carbonate from the base exchanger 3 is supplied to an external softener 4. In addition to supplying potassium carbonate to the softener, there may also be supplied to the softener calcium hydroxide or, if desired, potassium hydroxide.

The water 1 to be treated for use in a steam boiler contains sodium, calcium and magnesium salts. This water is passed through the softener 4 in which calcium and magnesium ions are removed by precipitation as insoluble compounds. The effluent from the softener containing potassium and sodium salts is fed to the boiler 5. If desired, the effluent from the softener may be further treated by suitable chemicals added either to the boiler or to the effluent before it enters the boiler, for example, disodium orthophosphate or other soluble alkali-metal phosphate 6 may be added to the water in the boiler. This causes precipitation of the residual calcium as a non-adherent calcium phosphate sludge which can be easily removed by blowdown.

The spent or exhausted base-exchange material 3 is regenerated from time to time as necessary with a potassium salt 7, the preferred salt being potassium chloride because it supplies potassium ion at the lowest cost. For regenerating the spent base-exchange material 3 I may purchase potassium chloride on the market and make a solution of it or I may utilize any other suitable solution containing the potassium ion. One very suitable and cheap source of potassium ion is the concentrated water removed from the boiler 5 by blowdown or otherwise. A portion of the boiler water is removed from the boiler, passed through a heat exchanger 8 to cool it, collected in a vessel 9, and any sludge 10 allowed to settle in the vessel. The water from the boiler containing potassium ion is treated with an acid material 11, if necessary, to reduce its alkalinity to a point where attack on the base-exchange material 3 is minimized. It is then used to regenerate the spent base-exchange material to potassium or potassium-sodium base-exchange material, after which it goes to waste.

In describing the invention thus far I have referred to the conversion of sodium carbonate into potassium carbonate by base exchange, and the use of the potassium carbonate along with potassium hydroxide or calcium hydroxide in an external softener. I may, however, use any soluble salt containing an anion which is useful in the treatment of water for steam boilers. These may be the sodium salts or soluble salts of other metals, for example, the alkaline-earth metals or magnesium. The alkaline-earth metal and magnesium ions may be more effectively exchanged for the potassium ion in passing through the potassium base exchanger than would the corresponding alkali-metal ion. I may use the sodium phosphates (including orthophosphates, or the molecularly dehydrated phosphates such as metaphosphates and pyrophosphates), carbonates, bicarbonates, sulphites, sulphates, nitrates, silicates and salts of organic acids. Of the soluble alkaline-earth compounds, such substances as calcium nitrate or calcium hydroxide may be employed. Magnesium sulphate and sulphite are other salts usable in this process. These salts are converted to the corresponding potassium salts in solution by passage through a potassium base-exchange material and are then used for treating water to be used in a boiler. The potassium salts in solution may be added directly to the boiler 5, as indicated by the reference numeral 12, or to any suitable point in the system prior to the point where the water enters the boiler. The amount of the potassium salt solution used in treating the water is in all cases relatively small as compared with the volume of the water to be treated. As an example, but not by way of limitation, where it is desired to remove residual calcium from boiler feed water containing, say, 15 P. P. M. calcium, there may be added to the boiler water, for each 1,000 gallons of feed water, the potassium phosphate solution resulting from passing 1 gallon of 5% solution of disodium orthophosphate through the exchanger 3.

The invention is not limited to the preferred materials or manner of carrying out the process, but may be otherwise embodied or practiced within the scope of the following claims.

I claim:

1. The process of treating water for use in a boiler, which comprises passing a solution of sodium carbonate having a concentration of at least 0.1% by weight through a potassium base exchanger, and mixing the effluent with water for use in a boiler and containing less than 0.1% by weight of sodium carbonate.

2. The process of treating water for use in a boiler, which comprises passing a solution of sodium carbonate having a concentration of at least 0.1% by weight through a potassium base exchanger, whereby the effluent contains potassium carbonate, adding the effluent and a hydroxide of the group consisting of alkali-metal and alkaline earth metal to the water to be supplied to the boiler and containing less than 0.1% by weight of salts of said group, whereby calcium and magnesium are precipitated, removing the precipitates and supplying the thus treated water to the boiler.

3. The process of treating water for use in a boiler, which comprises passing a solution of salt of the group consisting of sodium salts, alkaline-earth metal salts, and magnesium salts, and having a concentration of at least 0.1% by weight, said salt having an anion useful for treating water for use in a boiler, through a potassium base exchanger, whereby the effluent contains potassium ion and anion useful for treating water for use in a boiler, mixing the effluent with water for use in a boiler, removing a portion of the concentrated boiler water, said concentrated boiler water containing potassium salt in solution, and regenerating the spent base-exchange material with the concentrated water withdrawn from the boiler.

4. The process of treating water for use in a boiler, which comprises passing a solution of salt of the group consisting of sodium salts, alkaline-earth metal salts, and magnesium salts, and having a concentration of at least 0.1% by weight, said salt having an anion useful for treating water for use in a boiler, through a potassium base exchanger, whereby the effluent contains potassium ion and anion useful for treating water for use in a boiler, mixing the effluent with water for use in a boiler, removing a portion of the concentrated boiler water, said concentrated boiler water containing potassium salt in solution, cooling the water removed from the boiler, and regenerating the spent base-exchange material with the concentrated water withdrawn from the boiler.

5. The process of treating water for use in a boiler, which comprises passing a solution of salt of the group consisting of sodium salts, alkaline-earth metal salts, and magnesium salts, and having a concentration of at least 0.1% by weight, said salt having an anion useful for treating water for use in a boiler, through a potassium base exchanger, whereby the effluent contains potassium ion and anion useful for treating water for use in a boiler, mixing the effluent with water for use in a boiler, removing a portion of the concentrated boiler water, said concentrated boiler water containing potassium salt in solution, separating solid material suspended in the water removed from the boiler, and regenerating the spent base exchange material with the concentrated water withdrawn from the boiler.

6. The process of treating water for use in a boiler, which comprises passing a solution of salt of the group consisting of sodium salts, alkaline earth metal salts, and magnesium salts, and having a concentration of at least 0.1% by weight, said salt having an anion useful for treating water for use in a boiler, through a potassium base exchanger, whereby the effluent contains potassium ion and anion useful for treating water for use in a boiler, mixing the effluent with water for use in a boiler, removing a portion of the concentrated boiler water, said concentrated boiler water containing potassium salt in solution, lowering the alkalinity of the concentrated water removed from the boiler to minimize attack on a base exchange material, and regenerating the spent base exchange material with the concentrated water withdrawn from the boiler.

7. The process of treating water for use in a boiler, which comprises passing at ordinary atmospheric temperature a solution of salt of the group consisting of sodium salts, alkaline-earth metal salts, and magnesium salts, and having a concentration of at least 0.1% by weight, said salt having an anion useful for treating water for use in a boiler, through a potassium base exchanger, whereby the effluent contains potassium ion and anion useful for treating water for use in a boiler, mixing the effluent with water for use in a boiler, removing a portion of the concentrated boiler water, said concentrated boiler water containing potassium salt in solution, and regenerating the spent base-exchange material with the concentrated water withdrawn from the boiler.

GEORGE W. SMITH.

(References on following page)

REFERENCES CITED

The following references are of record in the file of this patent:

UNITED STATES PATENTS

| Number | Name | Date |
|---|---|---|
| 1,202,557 | Massaciu | Oct. 24, 1916 |
| 1,235,815 | Kriegsheim | Aug. 7, 1917 |
| 1,255,170 | Jacobus | Feb. 5, 1918 |
| 1,273,857 | Heller | July 30, 1918 |
| 1,344,830 | Spencer | June 29, 1920 |
| 1,426,638 | Hepburn | Aug. 22, 1922 |
| 1,455,363 | Spencer | May 15, 1923 |
| 1,701,075 | Jaeger et al. | Feb. 5, 1929 |
| 1,716,663 | Pike | June 11, 1929 |
| 1,742,714 | McGill | Jan. 7, 1930 |
| 1,956,515 | Hall | Apr. 24, 1934 |
| 1,965,339 | Hall | July 3, 1934 |
| 1,978,447 | Austerwell et al. | Oct. 20, 1934 |
| 1,996,136 | Zimmerman | Apr. 2, 1935 |
| 2,004,257 | Tschirner | June 11, 1935 |
| 2,059,552 | Churchill | Nov. 3, 1936 |
| 2,204,072 | Dean | June 11, 1940 |
| 2,208,172 | Urbain | July 6, 1940 |
| 2,330,865 | Butzler | Oct. 5, 1943 |
| 2,248,055 | Bird | July 8, 1941 |
| 2,283,172 | Bates | May 19, 1942 |

FOREIGN PATENTS

| Number | Country | Date |
|---|---|---|
| 805,092 | France | Nov. 10, 1936 |